United States Patent
Chen et al.

(10) Patent No.: US 12,126,265 B2
(45) Date of Patent: Oct. 22, 2024

(54) SWITCH MODE POWER SUPPLY CIRCUIT WITH HIGH VOLTAGE OUTPUT, AND ELECTROSTATIC SPRAY APPARATUS AND AGRICULTURAL PLANT PROTECTION APPARATUS USING THE SAME

(71) Applicant: National Formosa University, Huwei Township, Yunlin County (TW)

(72) Inventors: Yu-Kai Chen, Huwei Township, Yunlin County (TW); Chau-Chung Song, Chiayi (TW); Hung-Yu Chen, Huwei Township, Yunlin County (TW)

(73) Assignee: NATIONAL FORMOSA UNIVERSITY, Yunlin County (TW)

( * ) Notice: Subject to any disclaimer, the term of this patent is extended or adjusted under 35 U.S.C. 154(b) by 200 days.

(21) Appl. No.: 17/959,611

(22) Filed: Oct. 4, 2022

(65) Prior Publication Data

US 2023/0291318 A1    Sep. 14, 2023

(30) Foreign Application Priority Data

Mar. 11, 2022 (TW) .................... 111109061

(51) Int. Cl.
| | |
|---|---|
| *H02M 3/335* | (2006.01) |
| *A01G 7/04* | (2006.01) |
| *A01M 7/00* | (2006.01) |
| *B05B 5/10* | (2006.01) |
| *B64C 39/02* | (2023.01) |
| *H02M 1/08* | (2006.01) |
| *B64D 1/18* | (2006.01) |
| *B64U 101/00* | (2023.01) |

(52) U.S. Cl.
CPC .......... *H02M 3/33569* (2013.01); *A01G 7/04* (2013.01); *A01M 7/0042* (2013.01); *B05B 5/10* (2013.01); *B64C 39/024* (2013.01); *H02M 1/08* (2013.01); *B64D 1/18* (2013.01); *B64U 2101/00* (2023.01)

(58) Field of Classification Search
CPC ...... H02M 3/33569; H02M 1/08; A01G 7/04; A01M 7/0042; B05B 5/10; B64C 39/924; B64U 2101/00; B64D 1/18
See application file for complete search history.

(56) References Cited

U.S. PATENT DOCUMENTS

| | | | |
|---|---|---|---|
| 10,069,402 B2* | 9/2018 | Nakano | G03G 15/5004 |
| 11,063,513 B1* | 7/2021 | Breiter | H02M 3/156 |
| 11,114,931 B2* | 9/2021 | Huang | H02M 7/043 |

* cited by examiner

*Primary Examiner* — Adolf D Berhane
(74) *Attorney, Agent, or Firm* — MUNCY, GEISSLER, OLDS & LOWE, P.C.

(57) ABSTRACT

A switch mode power supply circuit with high voltage output, an electrostatic spray apparatus and agricultural plant protection apparatus using the same are provided. The switch mode power supply circuit is electrically connected in series with at least a pre-stage power converter and a post-stage power converter. In order to simplify the control, the switch of the pre-stage power converter is omitted, only one switch of the post-stage power converter is adopted to perform synchronous control. Since the multiple sets of power conversion circuits in the previous stage are connected in series, the turn ratio of the transformer in the power converter in the subsequent stage can be reduced. Therefore, the transformer can be miniaturized and the power supply circuit would be more suitable for agricultural plant protection machine and electrostatic spray apparatus.

22 Claims, 11 Drawing Sheets

SWITCH MODE POWER SUPPLY CIRCUIT WITH HIGH VOLTAGE OUTPUT, AND ELECTROSTATIC SPRAY APPARATUS AND AGRICULTURAL PLANT PROTECTION APPARATUS USING THE SAME

CROSS-REFERENCE TO RELATED APPLICATIONS

This application claims priority of Ser. No. 11/109,061 filed in Taiwan R.O.C. on Mar. 11, 2022 under 35 USC 119, the entire content of which is hereby incorporated by reference.

BACKGROUND OF THE INVENTION

Field of the Invention

The present invention relates to the technology of power converter, more particularly, the present invention relates to a switch mode power supply circuit, an electrostatic spray apparatus and an agricultural plant protection apparatus using the same.

Description of the Related Art

In agricultural production, it is found that plant protection operations account for 20% of the high yield factor and the use of pesticides is an extremely important means in agricultural production. The effect of pesticide spraying technology is directly related to the effective utilization of pesticides, so the research on spraying technology is of great significance. Comparing the traditional nozzle with the high-voltage electrostatic nozzle, the high-voltage electrostatic nozzle has a more excellent performance for pesticide spraying. More studies have pointed out that the liquid can be more attached to the surface of the plant when it passes through the nozzle with high-voltage electrostatic, which greatly improves the spraying effect and efficiency.

Electrostatic spraying, as the name suggests, uses static electricity to polarize liquids. For crops with plants standing on the ground, the distance from the pesticide mist particles in the air is short, which can make the mist droplets form canopy and electric curvature on the plants, so that the plants have a strong attraction to the polarized mist particles, and make it easy for the mist particles to reach the very dry bottom of the leaf back of the plant. According to the research, the electrostatic spraying method can not only increase the adhesion of pesticides to plants, but also make the particle size of the spray droplets finer and more uniform to improve the spraying efficiency. At present, electrostatic spray apparatus had already be commercially produced abroad, but its price is quite high, and most of them are hand-held electrostatic sprayers, which are rarely used in agricultural plant protection apparatus. Due to the components required for high-voltage circuits and the specifications of the transformer such as high turns ratio transformer, a larger transformer and better isolation must be used. However, the weight of the circuit will be increased and cannot be used in agricultural plant protection apparatus.

BRIEF SUMMARY OF THE INVENTION

An objective of the invention is to provide a switch mode power supply circuit with high voltage output, an electrostatic spray apparatus and agricultural plant protection apparatus using the same, for simplifying control and reducing turns ratio of the transformer, such that unmanned agricultural plant protection apparatus can be implemented.

In view of this, the invention provides a switch mode power supply circuit, adapted for outputting high voltage. The switch mode power supply circuit includes a first coil, a first unidirectional conduction element, a second unidirectional conduction element, a first capacitor, a power converter and a control circuit. The first coil includes a first terminal and a second terminal, wherein the first terminal of the first coil is coupled to a first power voltage. The first unidirectional conduction element includes a first terminal and a second terminal, wherein the first terminal of the first unidirectional conduction element is coupled to the second terminal of the first coil, wherein the first unidirectional conduction element limits the current flowing from the first terminal of the first unidirectional conduction element to the second terminal of the first unidirectional conduction element. The second unidirectional conduction element includes a first terminal and a second terminal, wherein the first terminal of the second unidirectional conduction element is coupled to the second terminal of the first coil, wherein the second unidirectional conduction element limits the current flowing from the first terminal of the second unidirectional conduction element to the second terminal of the second unidirectional conduction element.

The first capacitor includes a first terminal and a second terminal, wherein the first terminal of the first capacitor is coupled to the second terminal of the first unidirectional conduction element, and the second terminal of the first capacitor is coupled to a second power voltage. The power converter includes a transformer and a switching device. The transformer includes a primary coil and a secondary coil. The primary coil includes a first terminal and a second terminal, wherein the first terminal of the primary coil is coupled to the second terminal of the first unidirectional conduction element. The switching device includes a first terminal, a second terminal and a control terminal, wherein the first terminal of the switching device is coupled to the second terminal of the primary coil and the second terminal of the second unidirectional conduction element, and the second terminal of the switching device is coupled to the second power voltage. The control circuit is coupled to the control terminal of the switching device for controlling the switching device.

The invention further provides an electrostatic spray apparatus. The electrostatic spray apparatus includes a nozzle, a polarization metal and a switch mode power supply circuit. The polarization metal is disposed behind the nozzle, and it includes an opening such that the pesticide sprayed by nozzle can be passed through and be polarized by the polarization metal. The switch mode power supply circuit includes a first coil, a first unidirectional conduction element, a second unidirectional conduction element, a first capacitor, a power converter and a control circuit. The first coil includes a first terminal and a second terminal, wherein the first terminal of the first coil is coupled to a first power voltage. The first unidirectional conduction element includes a first terminal and a second terminal, wherein the first terminal of the first unidirectional conduction element is coupled to the second terminal of the first coil, wherein the first unidirectional conduction element limits the current flowing from the first terminal of the first unidirectional conduction element to the second terminal of the first unidirectional conduction element. The second unidirectional conduction element includes a first terminal and a second terminal, wherein the first terminal of the second unidirectional conduction element is coupled to the second terminal of the first coil, wherein the second unidirectional conduction element limits the current flowing from the first terminal of the second unidirectional conduction element to the second terminal of the second unidirectional conduction element.

The first capacitor includes a first terminal and a second terminal, wherein the first terminal of the first capacitor is coupled to the second terminal of the first unidirectional conduction element, and the second terminal of the first capacitor is coupled to a second power voltage. The power converter includes a transformer and a switching device. The transformer includes a primary coil and a secondary coil. The primary coil includes a first terminal and a second terminal, wherein the first terminal of the primary coil is coupled to the second terminal of the first unidirectional conduction element. The secondary coil is coupled to the polarization metal. The switching device includes a first terminal, a second terminal and a control terminal, wherein the first terminal of the switching device is coupled to the second terminal of the primary coil and the second terminal of the second unidirectional conduction element, and the second terminal of the switching device is coupled to the second power voltage. The control circuit is coupled to the control terminal of the switching device for controlling the switching device.

In the switch mode power supply circuit and the electrostatic spray apparatus according to a preferred embodiment of the present invention, the switch mode power supply circuit further includes a second coil, a third unidirectional conduction element, a fourth unidirectional conduction element and a second capacitor. The second coil includes a first terminal and a second terminal, wherein the first terminal of the second coil is coupled to the first power voltage. The third unidirectional conduction element includes a first terminal and a second terminal, wherein the first terminal of the third unidirectional conduction element is coupled to the second terminal of the second coil, and the second terminal of the third unidirectional conduction element is coupled to the first terminal of the first coil, wherein the third unidirectional conduction element limits the current flowing from the first terminal of the third unidirectional conduction element to the second terminal of the third unidirectional conduction element.

The fourth unidirectional conduction element includes a first terminal and a second terminal, wherein the first terminal of the fourth unidirectional conduction element is coupled to the second terminal of the second coil, and the second terminal of the fourth unidirectional conduction element is coupled to the first terminal of the second unidirectional conduction element, wherein the fourth unidirectional conduction element limits the current flowing from the first terminal of the fourth unidirectional conduction element to the second terminal of the fourth unidirectional conduction element. The second capacitor includes a first terminal and a second terminal, wherein the first terminal of the second capacitor is coupled to the second terminal of the third unidirectional conduction element, and the second terminal of the second capacitor is coupled to the second power voltage.

In the switch mode power supply circuit and the electrostatic spray apparatus according to a preferred embodiment of the present invention, the switch mode power supply circuit further includes a rectifier circuit, coupled to the secondary coil for converting a voltage output from the secondary coil to a DC voltage. In a preferred embodiment, the rectifier circuit includes a rectifier diode and a rectifier capacitor. The rectifier diode includes an anode and a cathode, wherein the anode of the rectifier diode is coupled to the first terminal of the secondary coil. The rectifier capacitor includes a first terminal and a second terminal, wherein the first terminal of the rectifier capacitor is coupled to the cathode of the rectifier diode, and the second terminal of the rectifier capacitor is coupled to the second terminal of the secondary coil.

In the switch mode power supply circuit and the electrostatic spray apparatus according to a preferred embodiment of the present invention, the transformer further includes an auxiliary winding, coupled to the control circuit, wherein the control circuit determines load for controlling the switching device according to a feedback voltage or a feedback current of the auxiliary winding.

The invention further provides a switch mode power supply circuit. The switch mode power supply circuit includes N power conversion circuits, a power converter and a control circuit. Each power conversion circuit includes a first terminal, a second terminal and a control terminal, wherein the Kth power conversion circuit includes a coil, a first unidirectional conduction element, a second unidirectional conduction element and a capacitor. The coil includes a first terminal and a second terminal, wherein the first terminal of the coil is coupled to the first terminal of the Kth power conversion circuit. The first unidirectional conduction element includes a first terminal and a second terminal, wherein the first terminal of the first unidirectional conduction element is coupled to the second terminal of the coil, and the second terminal of the first unidirectional conduction element is coupled to the second terminal of the Kth power conversion circuit, wherein the first unidirectional conduction element limits a current flowing from the first terminal of the first unidirectional conduction element to the second terminal of the first unidirectional conduction element;

The second unidirectional conduction element includes a first terminal and a second terminal, wherein the first terminal of the second unidirectional conduction element is coupled to the second terminal of the coil, and the second terminal of the second unidirectional conduction element is coupled to the control terminal of the Kth power conversion circuit, wherein the second unidirectional conduction element limits a current flowing from the first terminal of the second unidirectional conduction element to the second terminal of the second unidirectional conduction element. The capacitor includes a first terminal and a second terminal, wherein the first terminal of the capacitor is coupled to the second terminal of the first unidirectional conduction element, and the second terminal of the capacitor is coupled to a second power voltage.

The power converter includes a transformer and a switching device. The transformer includes a primary coil and a secondary coil. The primary coil includes a first terminal and a second terminal, wherein the first terminal of the primary coil is coupled to the second terminal of Nth power conversion circuit. The switching device includes a first terminal, a second terminal and a control terminal, wherein the first terminal of the switching device is coupled to the second terminal of the primary coil and the control terminal of each power conversion circuit, wherein the second terminal of the switching device is coupled to the second power voltage. The control circuit is coupled to the control terminal of the switching device for controlling the switching device, wherein the second terminal of Kth power conversion circuit is coupled to the first terminal of (K+1)th power conversion circuit, wherein N, K are natural numbers, and $0<K \leq N$.

The essence of the invention is to use multiple power conversion circuits in series controlling by a switching 
device of a power converter at rear stage to replace the original switching devices of the power conversion circuits in front stages such that the control of the power conversion is synchronized. Since the power conversion circuits are in series, the turns ratio of the transformer of the power converter at rear stage can be reduced. Thereby, the transformer can be miniaturized and more suitable for the application of agricultural plant protection apparatus and electrostatic spray apparatus.

The above-mentioned and other objects, features and advantages of the present invention will become more apparent from the following detailed descriptions of preferred embodiments taken in conjunction with the accompanying drawings.

DETAILED DESCRIPTION OF THE INVENTION

Figure 1A:
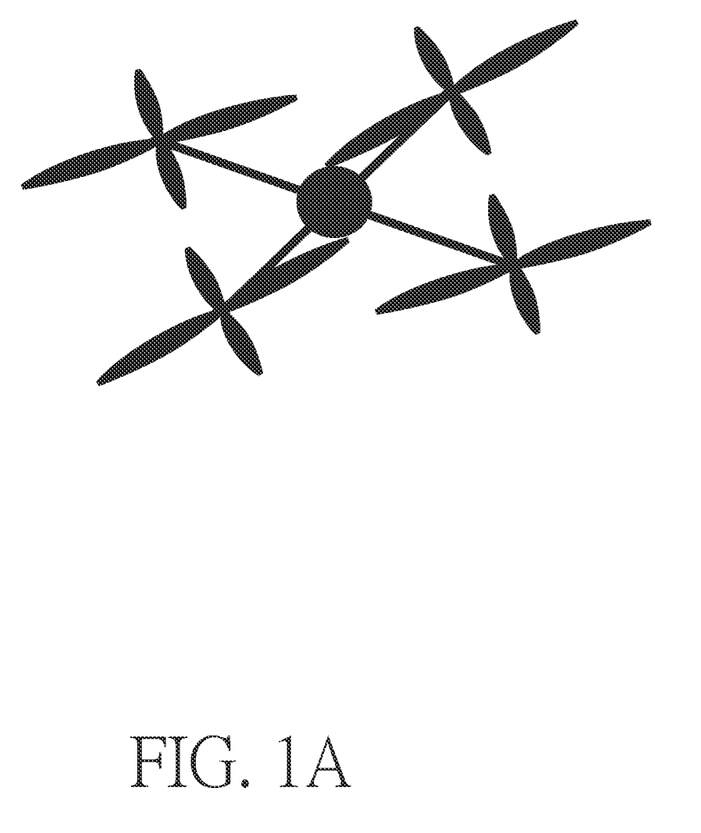
FIG. 1A illustrates a schematic diagram depicting an agricultural plant protection apparatus according to an embodiment of the present invention.

FIG. 1A illustrates a schematic diagram depicting an agricultural plant protection apparatus according to an embodiment of the present invention. Referring to FIG. 1A, in this embodiment, the agricultural plant protection apparatus is implemented by a quadrotor as an example. The quadrotor has an electrostatic spray apparatus (not shown) of a preferred embodiment of the present invention. In addition to being implemented in the form of a quadrotor unmanned aerial vehicle, the agricultural plant protection apparatus also includes a sprayer with a similar fixed position, and the application of the present invention is not limited thereto.

Figure 1B:
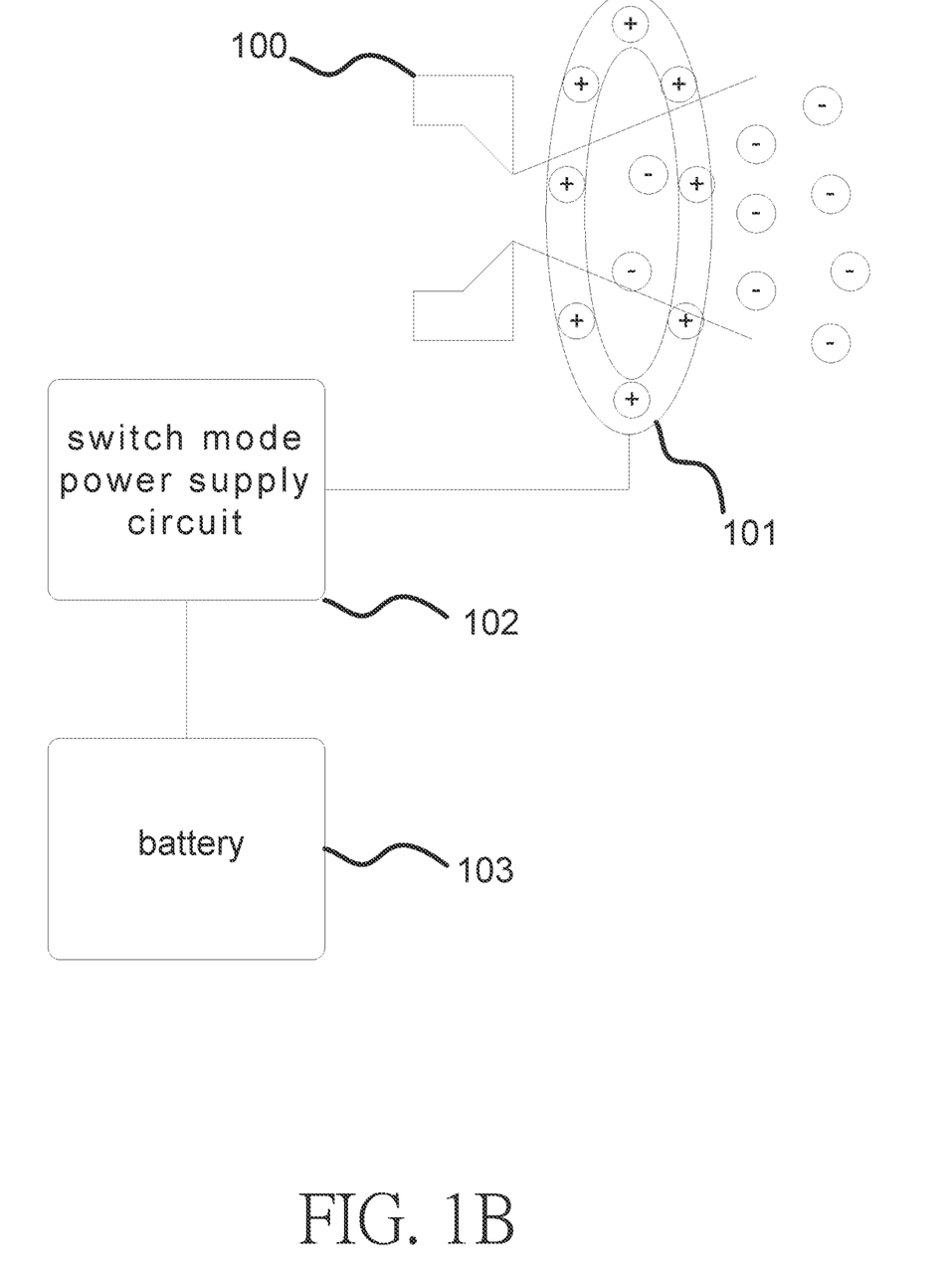
FIG. 1B illustrates a schematic diagram depicting an electrostatic spray apparatus according to an embodiment of the present invention.

FIG. 1B illustrates a schematic diagram depicting an electrostatic spray apparatus according to an embodiment of the present invention. Referring to FIG. 1B, the electrostatic spray apparatus includes a nozzle 100, a polarization metal 101, a switch mode power supply circuit 102 and a battery 103. In this embodiment, a high voltage is used to generate static electricity to polarize the liquid flowing through the nozzle. Since the nozzle of this embodiment is a positive electrode, the negative charge in the liquid will be attracted and sprayed out, as the principle that the same poles repel each other and the opposite poles attract each other, as shown in FIG. 1. The surface distribution of the liquid after spraying out is all negative charge.

Figure 2:
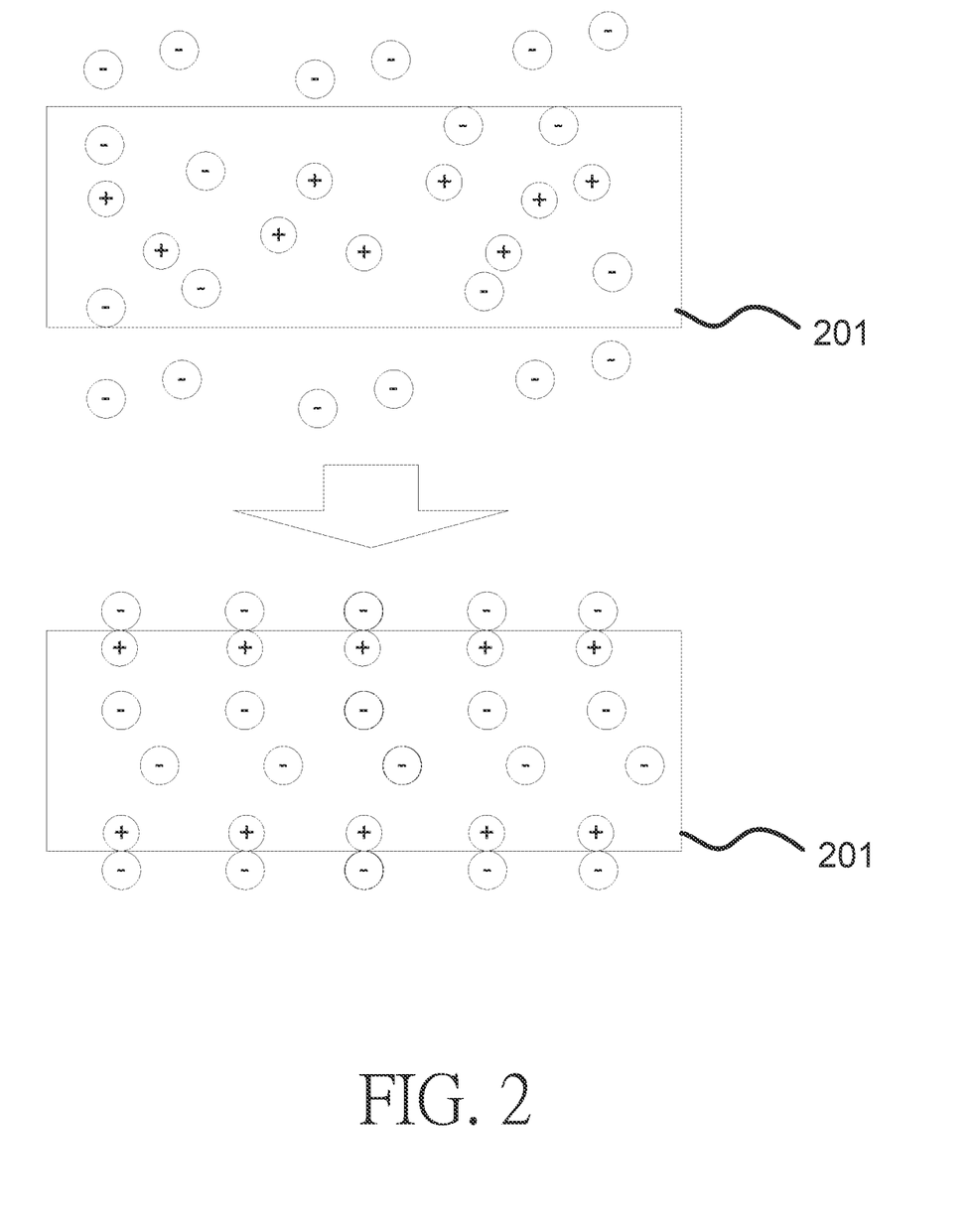
FIG. 2 illustrates a schematic diagram depicting liquid attachment to plants after spraying by an electrostatic spray apparatus and being polarized according to an embodiment of the present invention.
Figure 3A:
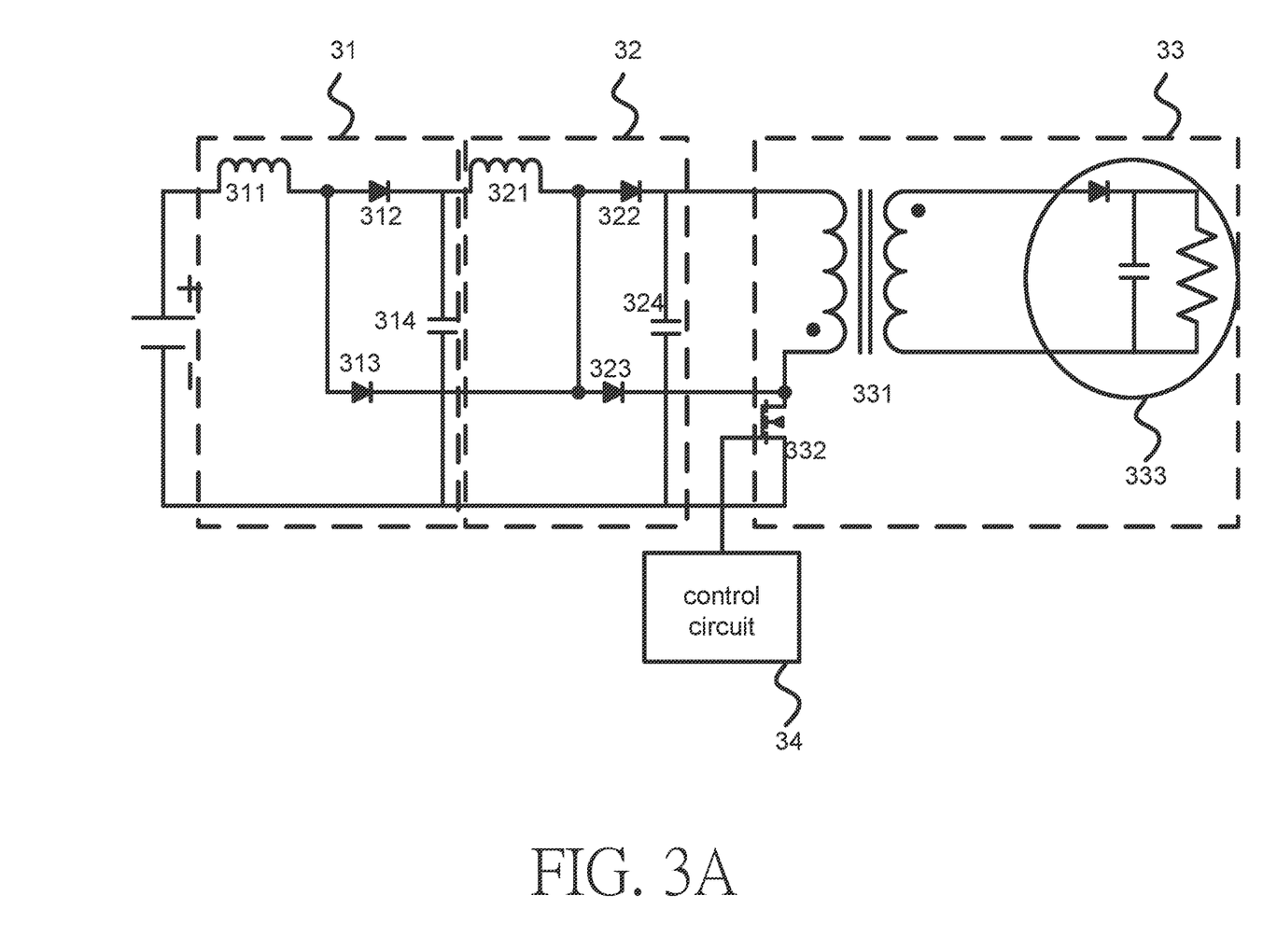
FIG. 3A illustrates a circuit diagram depicting a switch mode power supply circuit according to an embodiment of the present invention.

FIG. 2 illustrates a schematic diagram depicting liquid attachment to plants after spraying by an electrostatic spray apparatus and being polarized according to an embodiment of the present invention. Referring to FIG. 2, when the liquid is sprayed out, and is in contact with an electrically neutral plant 201, the same principle is used to attract the positive charge inside the plant and distribute it on the surface, and evenly and tightly adsorb it on the upper and lower surfaces of the plant, such as shown in FIG. 2. In this embodiment, the source of the high voltage is, for example, a battery on an unmanned agricultural plant protection apparatus. Using the principle of boosting, the low-voltage direct current is passed through the boost converter circuit and then connects a positive pole wire to the circular polarization metal 101. The positive electrode is evenly distributed in the nozzle to polarize the flowing liquid.

Since in this embodiment, the above electrostatic spray apparatus is applied to an unmanned agricultural plant protection apparatus (such as a quadrotor), it must comply with at least three important design principles: 1. small size and light weight; 2. low withstand voltage of active switch; 3. low noise. Therefore, according to the prior art, the size, weight and isolation of the transformer of a single-stage converter obviously cannot be applied to such an unmanned agricultural plant protection apparatus.

FIG. 3A illustrates a circuit diagram depicting a switch mode power supply circuit according to an embodiment of the present invention. Referring to FIG. 3A, in this embodiment, the switch mode power supply circuit includes a first power conversion circuit 31, a second power conversion circuit 32, a flyback power converter 33 and a control circuit 34. The first power conversion circuit 31 includes a first coil 311, a first unidirectional conduction element 312, a second unidirectional conduction element 313 and a first capacitor 314. The second power conversion circuit 32 includes a second coil 321, a third unidirectional conduction element 322, a fourth unidirectional conduction element 323 and a second capacitor 324. The flyback power converter 33 includes a transformer 331, a switching device 332 and a rectifier circuit 333.

In the abovementioned embodiment, the unidirectional conduction elements 312, 313, 322, 323, etc. are all implemented with diodes, and Schottky diodes are generally used. Those skilled in the art should know that in different applications, other elements, such as switching elements, may be used for implementation. The present invention is not limited thereto. The first terminal of the first coil 311 receives the battery voltage. The first terminal of the first unidirectional conduction element 312 is coupled to the second terminal of the first coil 311. The second terminal of the first unidirectional conduction element 312 is coupled to the first terminal of the second coil 321. The first terminal of the second unidirectional conduction element 312 is coupled to the second terminal of the first coil 311. The second terminal of the second unidirectional conduction element 312 is coupled to the first terminal of the fourth unidirectional conduction element 323. The first terminal of the third unidirectional conduction element 322 is coupled to the second terminal of the second coil 321. The second terminal of the third unidirectional conduction element 322 is coupled to the first terminal of the primary coil of the transformer 331.

In the above-mentioned embodiments, the first power conversion circuit 31 and the second power conversion circuit 32 are both modifications of the structure of the boost converter. The first power conversion circuit 31, the second power conversion circuit 32 and the flyback power converter 33 achieve synchronous control by sharing the same switching device 332. For understandable description of the concept of the circuit in FIG. 3A, FIG. 3B and FIG. 3C are used as supplementary explanations below.

Figure 3B:
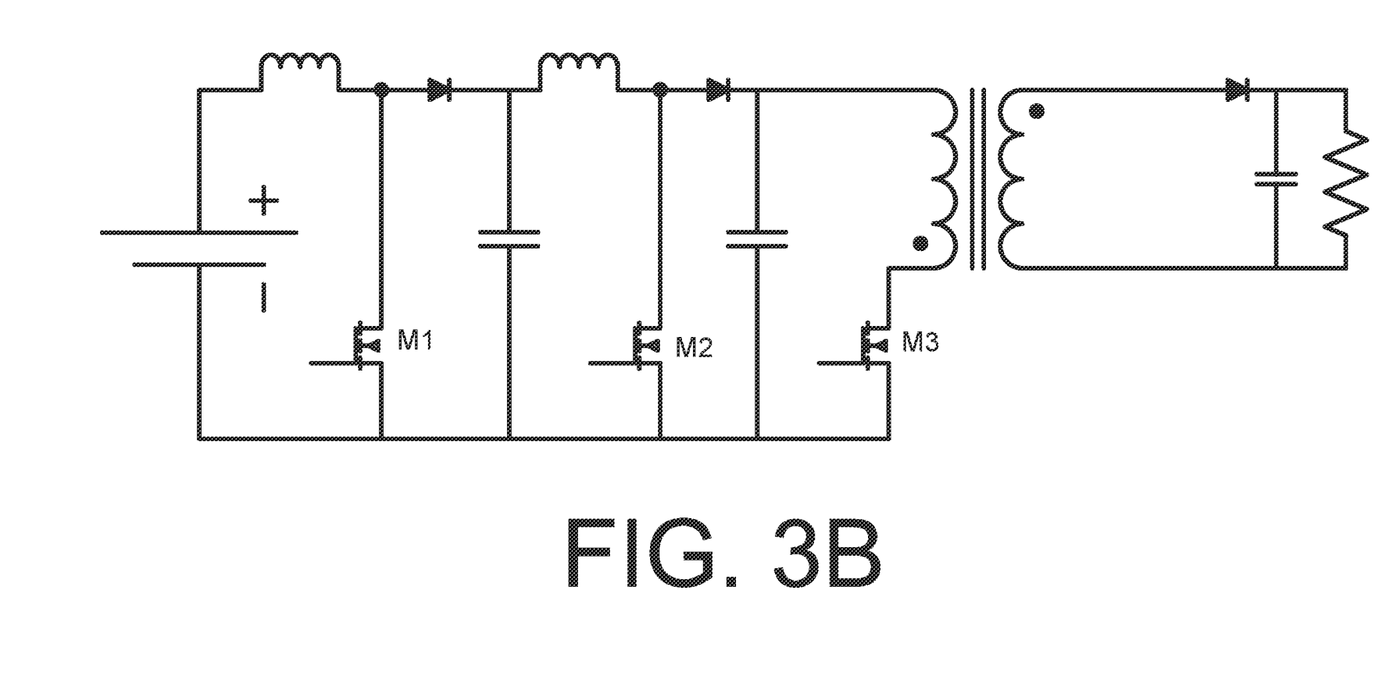
FIG. 3B illustrates a circuit diagram depicting a switch mode power supply circuit according to an embodiment of the present invention.
Figure 3C:
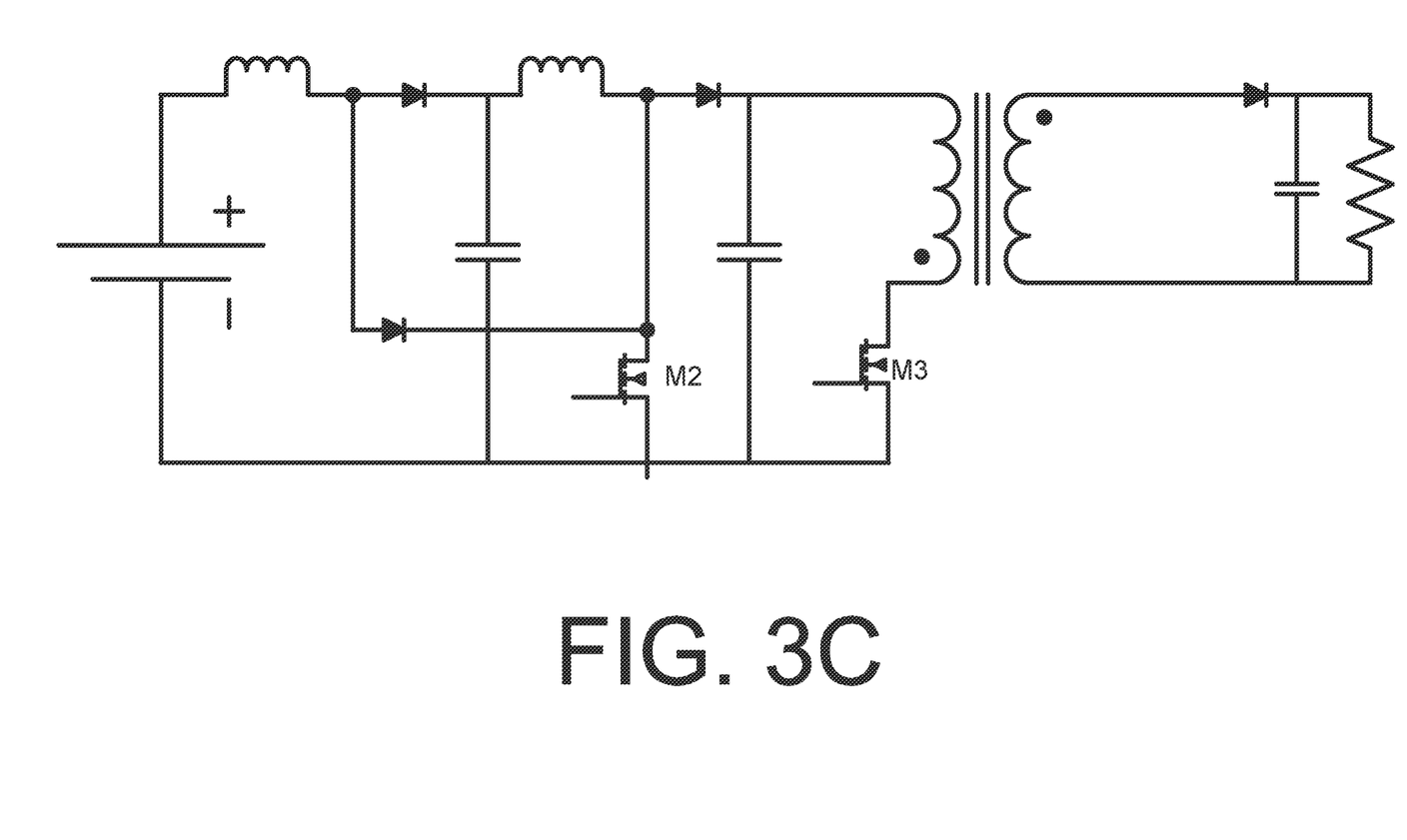
FIG. 3C illustrates a circuit diagram depicting a switch mode power supply circuit according to an embodiment of the present invention.

FIG. 3B illustrates a circuit diagram depicting a switch mode power supply circuit according to an embodiment of the present invention. FIG. 3C illustrates a circuit diagram depicting a switch mode power supply circuit according to an embodiment of the present invention. Referring to FIG. 3B and FIG. 3C, FIG. 3B is an original two-stage boost converter coupled with a flyback power converter at the rear stage, and is controlled separately by three switching devices M1, M2, and M3. FIG. 3C first uses the principle of synchronous switching to simplify the first two-stage boost converter into a single-stage circuit, changing the boost converter circuit that originally required two active switching device control into a circuit that only needs to be controlled by one active switching device M2. Therefore, the circuit will become a two-stage circuit at this time. Finally, Go back to FIG. 3A, it use the same method to synchronize the two-stage circuit to be controlled by a switching device 332. At this time, the circuit becomes a single-stage circuit, and two switching devices are removed.

Figure 4A:
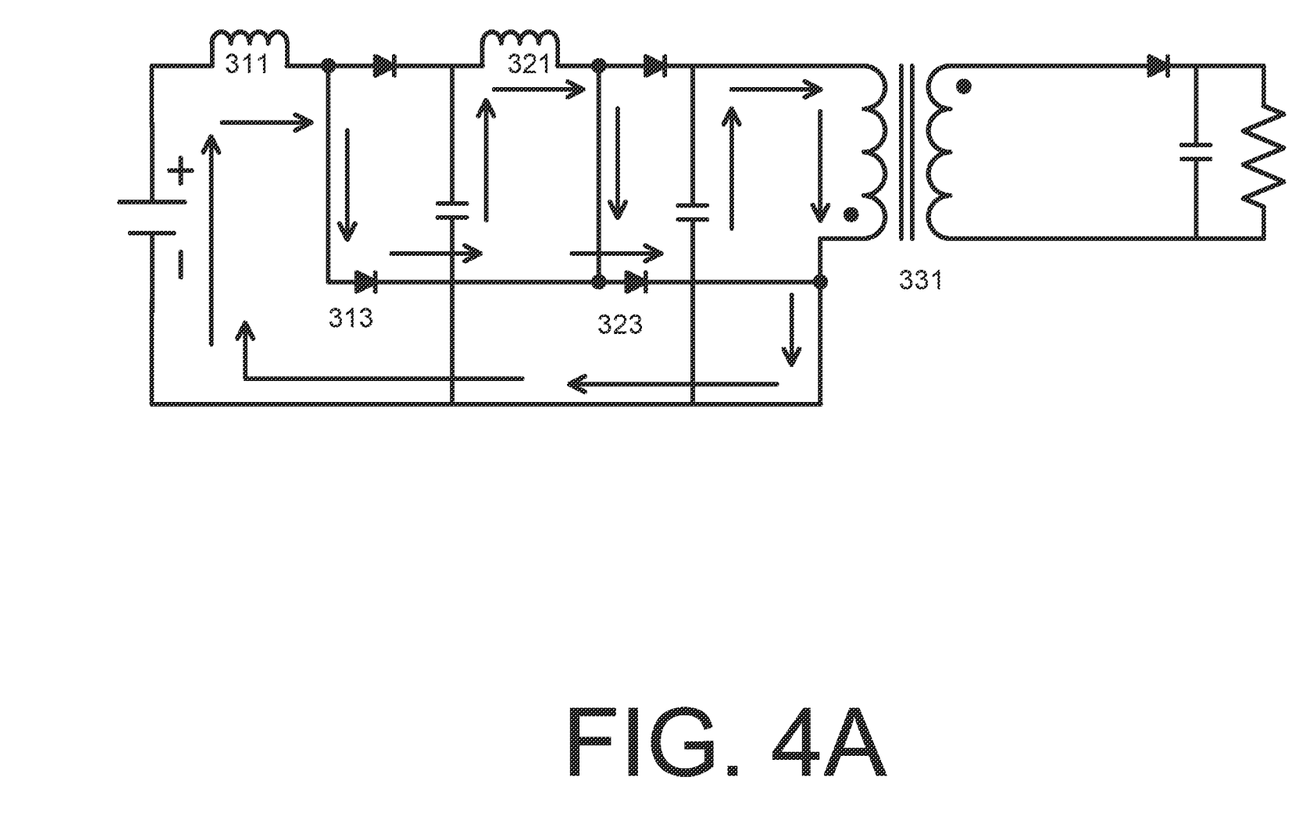
FIG. 4A illustrates a circuit diagram depicting an operation of a switch mode power supply circuit when the switching device 332 is turned on according to an embodiment of the present invention.

FIG. 4A illustrates a circuit diagram depicting an operation of a switch mode power supply circuit when the switching device 332 is turned on according to an embodiment of the present invention. Referring to FIG. 4A, when the switching device 332 is turned on, in the first power conversion circuit 31, the current flows from the battery through the first coil 311 and the second unidirectional conduction element 313 and the fourth unidirectional conduction element 323 for inductive energy storage. Similarly, in the second power conversion circuit 32, the current flows from the battery through the second coil 321 and the fourth unidirectional conduction element 323 to perform inductive energy storage. In the same way, the flyback power converter 33 stores energy in the magnetizing inductance of the transformer 331.

Figure 4B:
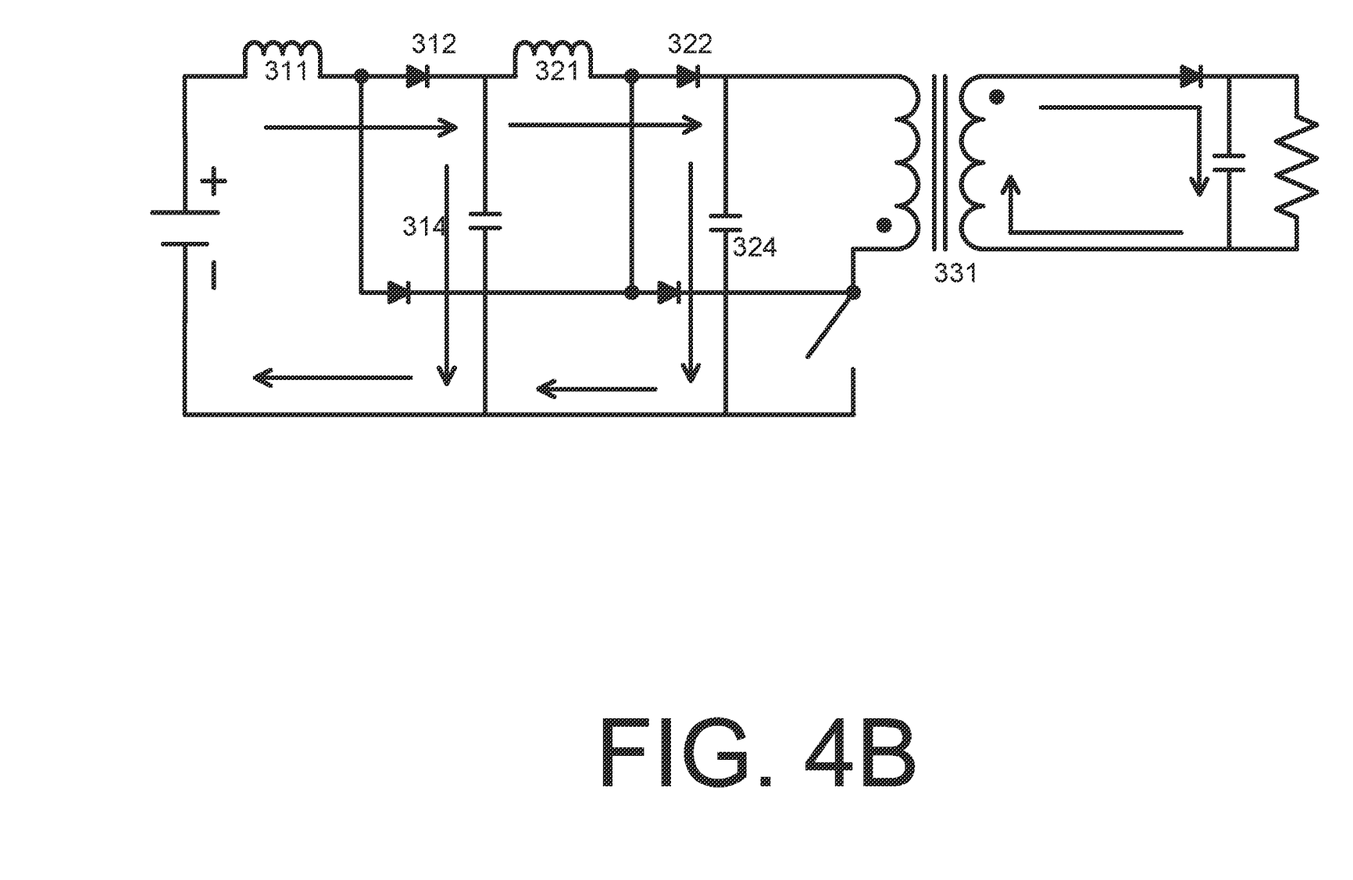
FIG. 4B illustrates a circuit diagram depicting an operation of a switch mode power supply circuit when the switching device 332 is turned off according to an embodiment of the present invention.

FIG. 4B illustrates a circuit diagram depicting an operation of a switch mode power supply circuit when the switching device 332 is turned off according to an embodiment of the present invention. Referring to FIG. 4B, when the switching device 332 is turned off, in the first power conversion circuit 31, the current flows from the battery through the first coil 311 and the first unidirectional conduction element 312 to release energy to the first capacitor 314. Likewise, in the second power conversion circuit 32, the current flows from the battery through the second coil 321 and the third unidirectional conduction element 322 to release energy to the second capacitor 324. In the same way, the flyback power converter 33 transfers the energy stored in the magnetizing inductance of the transformer 331 to the load through the rectifier circuit 333, and the transferred voltage and current vary according to the turns ratio of the transformer 331.

Since the battery voltage of the lithium battery of the aircraft of the plant protection machine is 48 VDC, in order to reduce the number of turns on the high-voltage side (completed in a single layer) to reduce the volume of the transformer and meet the requirements of high-voltage insulation, the number of turns of the flyback transformer is first determined. Then, the size of the duty cycle is obtained, and finally the component values of the converter are determined. The boost-boost converter in the embodiment of the present invention is used to increase the voltage to about 250-260 VDC, and finally the flyback power converter 33 is used to increase the voltage. up to 6.5 kVDC to implement high voltage electrostatic circuits.

Figure 5:
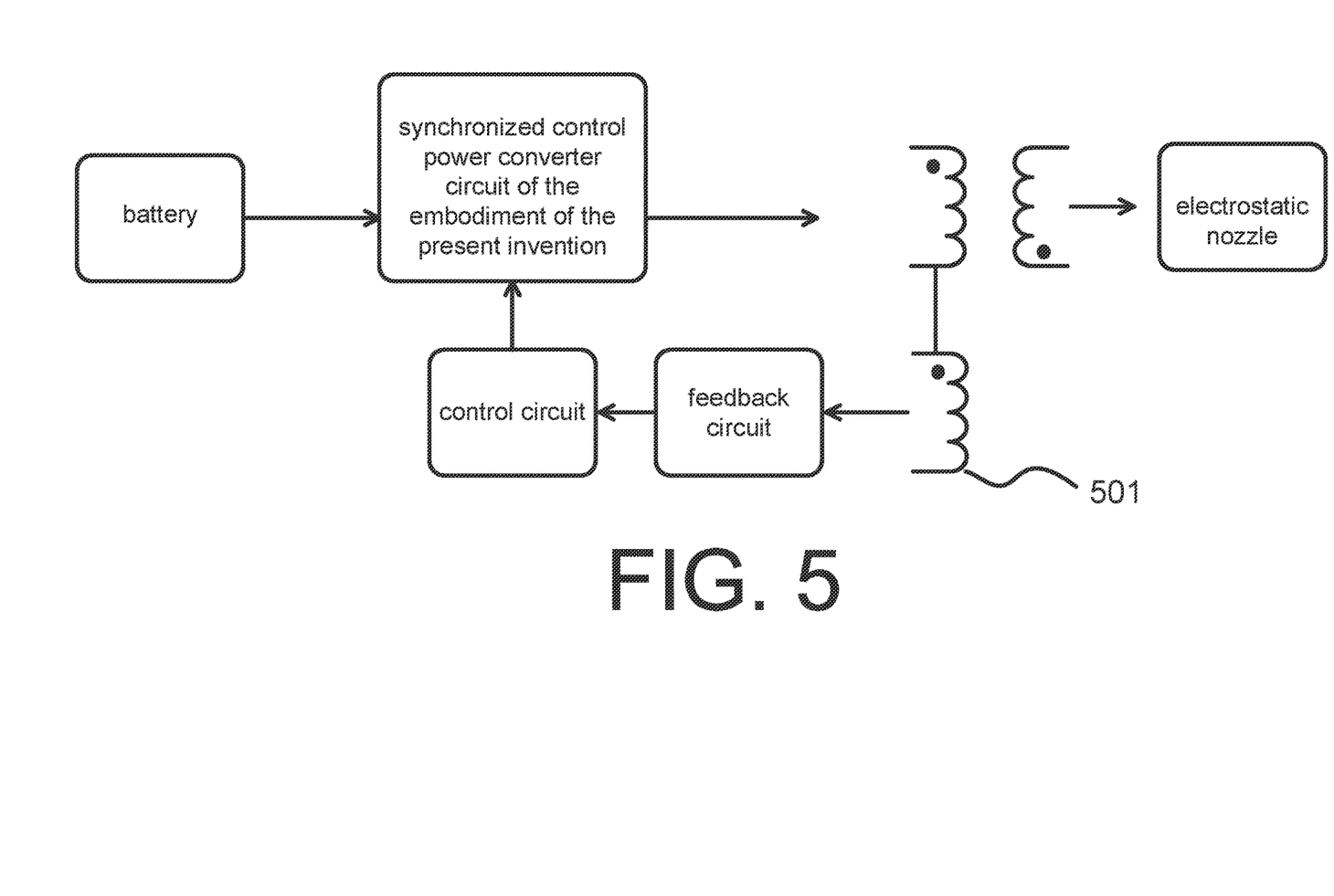
FIG. 5 illustrates a circuit block diagram depicting a system of a switch mode power supply circuit with feedback topology according to an embodiment of the present invention.

FIG. 5 illustrates a circuit block diagram depicting a system of a switch mode power supply circuit with feedback topology according to an embodiment of the present invention. Referring to FIG. 5, in the embodiment of the present invention, the circuit configuration adopts a quasi-resonant flyback. The circuit configuration is to use the PWM controller to cooperate with the auxiliary winding 501 of the transformer for feedback control. Since the secondary side outputs high voltage, if a general feedback circuit is used, high-voltage components are bound to be used, which will increase the circuit volume. Therefore, in this embodiment, a quasi-resonant feedback configuration is adopted, and the auxiliary winding 501 with a low-voltage primary side is used for feedback. Therefore, it can be applied to the above-mentioned electrostatic spray apparatus and the above-mentioned unmanned agricultural plant protection apparatus.

Figure 6:
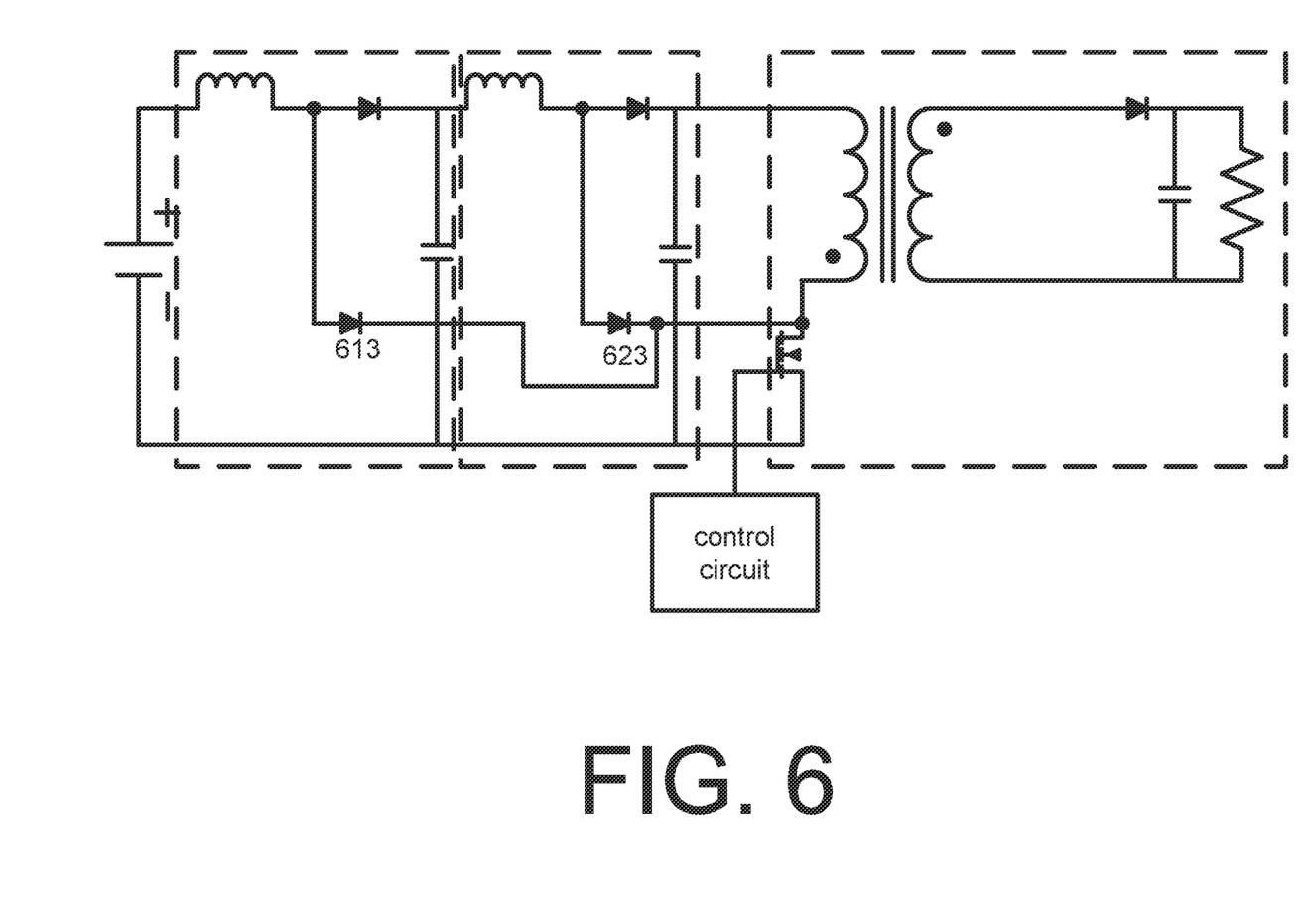
FIG. 6 illustrates a circuit diagram depicting a switch mode power supply circuit according to an embodiment of the present invention.

FIG. 6 illustrates a circuit diagram depicting a switch mode power supply circuit according to an embodiment of the present invention. Referring to FIG. 6 and FIG. 3A, the difference between the circuit of the embodiment of FIG. 6 and the circuit of the embodiment of FIG. 3A is that the second unidirectional conduction element 613 and the fourth unidirectional conduction element 623 in FIG. 6 are electrically connected to a common node. However, the second unidirectional conduction element 313 and the fourth unidirectional conduction element 323 in FIG. 3A are electrically connected in series. Since the operation principle of the circuit of the embodiment of FIG. 6 is the same as the operation principle of the circuit of FIG. 3A, the detail description is omitted.

Figure 7:
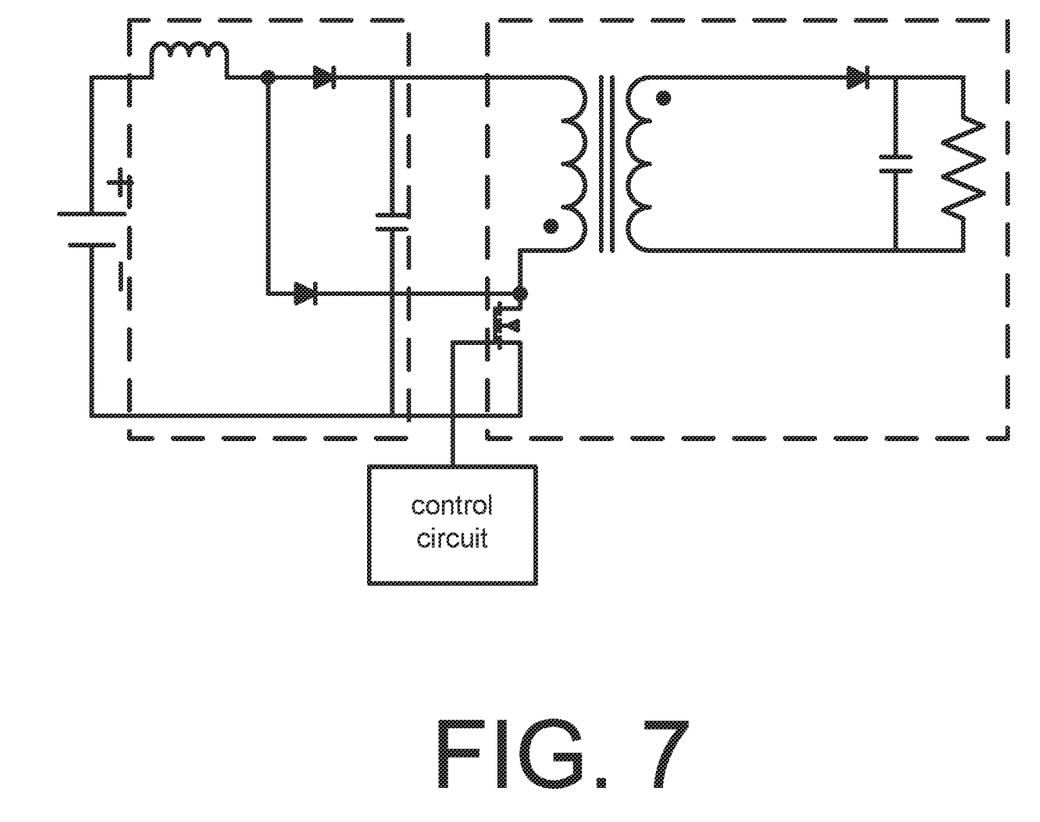
FIG. 7 illustrates a circuit diagram depicting a switch mode power supply circuit according to an embodiment of the present invention.

FIG. 7 illustrates a circuit diagram depicting a switch mode power supply circuit according to an embodiment of the present invention. Referring to FIG. 7, the difference between the embodiment of FIG. 7 and the embodiment of FIG. 3A is that FIG. 7 only adopts one-stage boost conversion configuration. Without departing from the spirit of the present invention, those skilled in the art also can use only one stage of boost conversion to implement the present invention. The detail description is omitted.

For the same reason, the above-mentioned embodiments can also adopt three-stage or multi-stage boost conversion configuration. And the unidirectional conduction elements being electrically connected to the switching device 332 can also adopt a parallel or series circuit configuration. The present invention does not limit the number of cascades of boost conversion configuration. Furthermore, although the rectifier circuit 333 in the above-mentioned embodiment is implemented by a diode and a capacitor, those skilled in the art should know that the rectifier circuit 333 still has other variations, which may even vary with the type of different converters. For example, the rectifier circuit of the forward converter would be implemented by an inductor, a capacitor, and diodes. Thus, the present invention is not limited thereto.

In summary, the essence of the present invention is to use multiple power conversion circuits in series controlling by a switching device of a power converter at rear stage to replace the original switching devices of the power conversion circuits in front stages such that the control of the power conversion is synchronized. Since the power conversion circuits are in series, the turns ratio of the transformer of the power converter at rear stage can be reduced. Thereby, the transformer can be miniaturized and more suitable for the application of agricultural plant protection apparatus and electrostatic spray apparatus.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A switch mode power supply circuit, comprising:
   a first coil, comprising a first terminal and a second terminal, wherein the first terminal of the first coil is coupled to a first power voltage;
   a first unidirectional conduction element, comprising a first terminal and a second terminal, wherein the first terminal of the first unidirectional conduction element is coupled to the second terminal of the first coil, wherein the first unidirectional conduction element limits a current flowing from the first terminal of the first unidirectional conduction element to the second terminal of the first unidirectional conduction element;
   a second unidirectional conduction element, comprising a first terminal and a second terminal, wherein the first terminal of the second unidirectional conduction element is coupled to the second terminal of the first coil, wherein the second unidirectional conduction element limits a current flowing from the first terminal of the second unidirectional conduction element to the second terminal of the second unidirectional conduction element;
   a first capacitor, comprising a first terminal and a second terminal, wherein the first terminal of the first capacitor is coupled to the second terminal of the first unidirectional conduction element, and the second terminal of the first capacitor is coupled to a second power voltage;
   a power converter, comprising:
      a transformer, comprising:
         a primary coil, comprising a first terminal and a second terminal, wherein the first terminal of the primary coil is coupled to the second terminal of the first unidirectional conduction element; and
         a secondary coil;
      a switching device, comprising a first terminal, a second terminal and a control terminal, wherein the first terminal of the switching device is coupled to the second terminal of the primary coil and the second terminal of the second unidirectional conduction element, wherein the second terminal of the switching device is coupled to the second power voltage; and
      a control circuit, coupled to the control terminal of the switching device for controlling the switching device.

2. The switch mode power supply circuit according to claim 1, further comprising:
   a second coil, comprising a first terminal and a second terminal, wherein the first terminal of the second coil is coupled to the first power voltage;
   a third unidirectional conduction element, comprising a first terminal and a second terminal, wherein the first terminal of the third unidirectional conduction element is coupled to the second terminal of the second coil, and the second terminal of the third unidirectional conduction element is coupled to the first terminal of the first coil, wherein the third unidirectional conduction element limits a current flowing from the first terminal of the third unidirectional conduction element to the second terminal of the third unidirectional conduction element;
   a fourth unidirectional conduction element, comprising a first terminal and a second terminal, wherein the first terminal of the fourth unidirectional conduction element is coupled to the second terminal of the second coil, the second terminal of the fourth unidirectional conduction element is coupled to the first terminal of the second unidirectional conduction element, wherein the fourth unidirectional conduction element limits a current flowing from the first terminal of the fourth unidirectional conduction element to the second terminal of the fourth unidirectional conduction element; and
   a second capacitor, comprising a first terminal and a second terminal, wherein the first terminal of the second capacitor is coupled to the second terminal of the third unidirectional conduction element, and the second terminal of the second capacitor is coupled to the second power voltage.

3. The switch mode power supply circuit according to claim 1, further comprising:
   a rectifier circuit, coupled to the secondary coil, for converting a voltage output from the secondary coil to an DC voltage.

4. The switch mode power supply circuit according to claim 3, wherein the rectifier circuit comprising:
   a rectifier diode, comprising an anode and a cathode, wherein the anode of the rectifier diode is coupled to the first terminal of the secondary coil; and
   a rectifier capacitor, comprising a first terminal and a second terminal, wherein the first terminal of the rectifier capacitor is coupled to the cathode of the rectifier diode, and the second terminal of the rectifier capacitor is coupled to the second terminal of the secondary coil.

5. The switch mode power supply circuit according to claim 1, wherein the transformer further comprises:
   an auxiliary winding, coupled to the control circuit, wherein the control circuit determines load for controlling the switching device according to a feedback voltage or a feedback current of the auxiliary winding.

6. A switch mode power supply circuit, comprising:
   N power conversion circuits, each power conversion circuit comprising a first terminal, a second terminal and a control terminal, wherein the Kth power conversion circuit comprises:
      a coil, comprising a first terminal and a second terminal, wherein the first terminal of the coil is coupled to the first terminal of the Kth power conversion circuit;
      a first unidirectional conduction element, comprising a first terminal and a second terminal, wherein the first terminal of the first unidirectional conduction element is coupled to the second terminal of the coil, and the second terminal of the first unidirectional conduction element is coupled to the second terminal of the Kth power conversion circuit, wherein the first unidirectional conduction element limits a current flowing from the first terminal of the first unidirectional conduction element to the second terminal of the first unidirectional conduction element;

a second unidirectional conduction element, comprising a first terminal and a second terminal, wherein the first terminal of the second unidirectional conduction element is coupled to the second terminal of the coil, and the second terminal of the second unidirectional conduction element is coupled to the control terminal of the Kth power conversion circuit, wherein the second unidirectional conduction element limits a current flowing from the first terminal of the second unidirectional conduction element to the second terminal of the second unidirectional conduction element;

a capacitor, comprising a first terminal and a second terminal, wherein the first terminal of the capacitor is coupled to the second terminal of the first unidirectional conduction element, and the second terminal of the capacitor is coupled to a second power voltage;

a power converter, comprising:
a transformer, comprising:
a primary coil, comprising a first terminal and a second terminal, wherein the first terminal of the primary coil is coupled to the second terminal of Nth power conversion circuit; and
a secondary coil;
a switching device, comprising a first terminal, a second terminal and a control terminal, wherein the first terminal of the switching device is coupled to the second terminal of the primary coil and the control terminal of each power conversion circuit, wherein the second terminal of the switching device is coupled to the second power voltage; and
a control circuit, coupled to the control terminal of the switching device for controlling the switching device,
wherein the second terminal of Kth power conversion circuit is coupled to the first terminal of (K+1)th power conversion circuit,
wherein N, K are natural numbers, and $0<K\leq N$.

7. The switch mode power supply circuit according to claim 6, further comprising:
a rectifier circuit, coupled to the secondary coil, for converting a voltage output from the secondary coil to an DC voltage.

8. The switch mode power supply circuit according to claim 7, wherein the rectifier circuit comprises:
a rectifier diode, comprising an anode and a cathode, wherein the anode of the rectifier diode is coupled to the first terminal of the secondary coil; and
a rectifier capacitor, comprising a first terminal and a second terminal, wherein the first terminal of the rectifier capacitor is coupled to the cathode of the rectifier diode, and the second terminal of the rectifier capacitor is coupled to the second terminal of the secondary coil.

9. The switch mode power supply circuit according to claim 6, wherein the transformer further comprises:
an auxiliary winding, coupled to the control circuit, wherein the control circuit determines load for controlling the switching device according to a feedback voltage or a feedback current of the auxiliary winding.

10. The switch mode power supply circuit according to claim 6, wherein
the second terminal of the second unidirectional conduction element of Kth power conversion circuit is coupled to the first terminal of the second unidirectional conduction element of (K+1) power conversion circuit.

11. The switch mode power supply circuit according to claim 6, wherein each power conversion circuit is a boost converter circuit.

12. The switch mode power supply circuit according to claim 6, wherein the power converter is a flyback converter circuit.

13. An electrostatic spray apparatus, comprising:
a nozzle;
a polarization metal, comprising an opening, disposed behind the nozzle such that pesticide sprayed by nozzle can be passed through the polarization metal and be polarized by the polarization metal;
a switch mode power supply circuit, comprising:
a first coil, comprising a first terminal and a second terminal, wherein the first terminal of the first coil is coupled to a first power voltage;
a first unidirectional conduction element, comprising a first terminal and a second terminal, wherein the first terminal of the first unidirectional conduction element is coupled to the second terminal of the first coil, wherein the first unidirectional conduction element limits current flowing from the first terminal of the first unidirectional conduction element to the second terminal of the first unidirectional conduction element;
a second unidirectional conduction element, comprising a first terminal and a second terminal, wherein the first terminal of the second unidirectional conduction element is coupled to the second terminal of the first coil, wherein the second unidirectional conduction element limits current flowing from the first terminal of the second unidirectional conduction element to the second terminal of the second unidirectional conduction element;
a first capacitor, comprising a first terminal and a second terminal, wherein the first terminal of the first capacitor is coupled to the second terminal of the first unidirectional conduction element, and the second terminal of the first capacitor is coupled to a second power voltage;
a power converter, comprising:
a transformer, comprising:
a primary coil, comprising a first terminal and a second terminal, wherein the first terminal of the primary coil is coupled to the second terminal of the first unidirectional conduction element; and
a secondary coil, coupled to the polarization metal;
a switching device, comprising a first terminal, a second terminal and a control terminal, wherein the first terminal of the switching device is coupled to the second terminal of the primary coil and the second terminal of the second unidirectional conduction element, and the second terminal of the switching device is coupled to the second power voltage; and
a control circuit, coupled to the control terminal of the switching device for controlling the switching device.

14. The electrostatic spray apparatus according to claim 13, further comprising:
- a second coil, comprising a first terminal and a second terminal, wherein the first terminal of the second coil is coupled to the first power voltage;
- a third unidirectional conduction element, comprising a first terminal and a second terminal, wherein the first terminal of the third unidirectional conduction element is coupled to the second terminal of the second coil, and the second terminal of the third unidirectional conduction element is coupled to the first terminal of the first coil, wherein the third unidirectional conduction element limits current flowing from the first terminal of the third unidirectional conduction element to the second terminal of the third unidirectional conduction element;
- a fourth unidirectional conduction element, comprising a first terminal and a second terminal, wherein the first terminal of the fourth unidirectional conduction element is coupled to the second terminal of the second coil, and the second terminal of the fourth unidirectional conduction element is coupled to the first terminal of the second unidirectional conduction element, wherein the fourth unidirectional conduction element limits current flowing from the first terminal of the fourth unidirectional conduction element to the second terminal of the fourth unidirectional conduction element; and
- a second capacitor, comprising a first terminal and a second terminal, wherein the first terminal of the second capacitor is coupled to the second terminal of the third unidirectional conduction element, and the second terminal of the second capacitor is coupled to the second power voltage.

15. The electrostatic spray apparatus according to claim 13, wherein the switch mode power supply circuit further comprises:
- a rectifier circuit, coupled to the secondary coil, for converting a voltage output from the secondary coil to an DC voltage.

16. The electrostatic spray apparatus according to claim 15, wherein the rectifier circuit comprises:
- a rectifier diode, comprising an anode and a cathode, wherein the anode of the rectifier diode is coupled to the first terminal of the secondary coil, and the cathode of the rectifier diode is coupled to the polarization metal; and
- a rectifier capacitor, comprising a first terminal and a second terminal, wherein the first terminal of the rectifier capacitor is coupled to the cathode of the rectifier diode, and the second terminal of the rectifier capacitor is coupled to the second terminal of the secondary coil.

17. The electrostatic spray apparatus according to claim 13, wherein the transformer further comprises:
- an auxiliary winding, coupled to the control circuit, wherein the control circuit determines load for controlling the switching device according to a feedback voltage or a feedback current of the auxiliary winding.

18. An agricultural plant protection apparatus, comprising:
- an aircraft, comprising:
  - a battery;
  - an electrostatic spray apparatus, comprising:
    - a nozzle;
    - a polarization metal, comprising an opening, disposed behind the nozzle, such that pesticide sprayed by nozzle can be pass through the polarization metal and be polarized by the polarization metal;
    - a switch mode power supply circuit, comprising:
      - a first coil, comprising a first terminal and a second terminal, wherein the first terminal of the first coil is coupled to the battery to receive a first power voltage;
      - a first unidirectional conduction element, comprising a first terminal and a second terminal, wherein the first terminal of the first unidirectional conduction element is coupled to the second terminal of the first coil, wherein the first unidirectional conduction element limits current flowing from the first terminal of the first unidirectional conduction element to the second terminal of the first unidirectional conduction element;
      - a second unidirectional conduction element, comprising a first terminal and a second terminal, wherein the first terminal of the second unidirectional conduction element is coupled to the second terminal of the first coil, wherein the second unidirectional conduction element limits current flowing from the first terminal of the second unidirectional conduction element to the second terminal of the second unidirectional conduction element;
      - a first capacitor, comprising a first terminal and a second terminal, wherein the first terminal of the first capacitor is coupled to the second terminal of the first unidirectional conduction element, and the second terminal of the first capacitor is coupled to a second power voltage;
      - a power converter, comprising:
        - a transformer, comprising:
          - a primary coil, comprising a first terminal and a second terminal, wherein the first terminal of the primary coil is coupled to the second terminal of the first unidirectional conduction element; and
          - a secondary coil, coupled to the polarization metal;
        - a switching device, comprising a first terminal, a second terminal and a control terminal, wherein the first terminal of the switching device is coupled to the second terminal of the primary coil and the second terminal of the second unidirectional conduction element, and the second terminal of the switching device is coupled to the second power voltage; and
        - a control circuit, coupled to the control terminal of the switching device for controlling the switching device.

19. The agricultural plant protection apparatus according to claim 18, further comprising:
- a second coil, comprising a first terminal and a second terminal, wherein the first terminal of the second coil is coupled to the first power voltage;
- a third unidirectional conduction element, comprising a first terminal and a second terminal, wherein the first terminal of the third unidirectional conduction element is coupled to the second terminal of the second coil, and the second terminal of the third unidirectional conduction element is coupled to the first terminal of the first coil, wherein the third unidirectional conduction element limits current flowing from the first terminal of the third unidirectional conduction element to the second terminal of the third unidirectional conduction element;

a fourth unidirectional conduction element, comprising a first terminal and a second terminal, wherein the first terminal of the fourth unidirectional conduction element is coupled to the second terminal of the second coil, and the second terminal of the fourth unidirectional conduction element is coupled to the first terminal of the second unidirectional conduction element, wherein the fourth unidirectional conduction element limits current flowing from the first terminal of the fourth unidirectional conduction element to the second terminal of the fourth unidirectional conduction element; and a second capacitor, comprising a first terminal and a second terminal, wherein the first terminal of the second capacitor is coupled to the second terminal of the third unidirectional conduction element, and the second terminal of the second capacitor is coupled to the second power voltage.

20. The agricultural plant protection apparatus according to claim 18, wherein the switch mode power supply circuit further comprises:

a rectifier circuit, coupled to the secondary coil, for converting a voltage output from the secondary coil to an DC voltage.

21. The agricultural plant protection apparatus according to claim 20, wherein the rectifier circuit comprises:

a rectifier diode, comprising an anode and a cathode, wherein the anode of the rectifier diode is coupled to the first terminal of the secondary coil, and the cathode of the rectifier diode is coupled to the polarization metal; and a rectifier capacitor, comprising a first terminal and a second terminal, wherein the first terminal of the rectifier capacitor is coupled to the cathode of the rectifier diode, and the second terminal of the rectifier capacitor is coupled to the second terminal of the secondary coil.

22. The agricultural plant protection apparatus according to claim 18, wherein the rectifier circuit comprises:

an auxiliary winding, coupled to the control circuit, wherein the control circuit determines load for controlling the switching device according to a feedback voltage or a feedback current of the auxiliary winding.

* * * * *